(12) United States Patent
Yang et al.

(10) Patent No.: US 8,164,806 B2
(45) Date of Patent: Apr. 24, 2012

(54) IMAGE READING APPARATUS

(75) Inventors: MunSeok Yang, Incheon (KR); KiWoo Sok, Incheon (KR)

(73) Assignee: Fuji Xerox Co., Ltd., Tokyo (JP)

( * ) Notice: Subject to any disclaimer, the term of this patent is extended or adjusted under 35 U.S.C. 154(b) by 444 days.

(21) Appl. No.: 12/552,521

(22) Filed: Sep. 2, 2009

(65) Prior Publication Data

US 2010/0238524 A1    Sep. 23, 2010

(30) Foreign Application Priority Data

Mar. 17, 2009   (JP) ................................. 2009-064726

(51) Int. Cl.
 *H04N 1/04* (2006.01)
(52) U.S. Cl. ......... 358/498; 358/496; 358/486; 358/406
(58) Field of Classification Search .................. 358/498, 358/496, 486, 406, 461, 474
 See application file for complete search history.

(56) References Cited

U.S. PATENT DOCUMENTS

| 6,027,109 | A | 2/2000 | Wada et al. |
| 6,254,078 | B1 * | 7/2001 | Taruki .......................... 271/3.01 |
| 7,317,561 | B2 * | 1/2008 | Makino et al. ................ 358/496 |
| 7,667,879 | B2 * | 2/2010 | Makino et al. ................ 358/498 |
| 2002/0008351 | A1 | 1/2002 | Kawamoto et al. ........... 271/264 |
| 2003/0117673 | A1 | 6/2003 | Yamanaka |

FOREIGN PATENT DOCUMENTS

| JP | 10-142851 | 5/1998 |
| JP | 2002-108025 A | 4/2002 |
| JP | 2003-189069 | 7/2003 |
| JP | 2006-042193 | 2/2006 |
| JP | 2007-68024 A | 3/2007 |
| JP | 2007-79052 A | 3/2007 |

* cited by examiner

*Primary Examiner* — Houshang Safaipour
(74) *Attorney, Agent, or Firm* — Morgan, Lewis & Bockius LLP

(57) ABSTRACT

When a cover portion covers a document table, a document transporting unit is positioned relative to a reinforcing member in the horizontal direction so that the document transporting unit is movable in the vertical direction, and a first vertical positioning member comes into contact with the document table of a reading unit or the periphery thereof to position the document transporting unit in the vertical direction based on the position of the document table. A document height regulating member is positioned relative to the reinforcing member in the horizontal direction so as to be movable in the vertical direction, and a second vertical positioning member comes into contact with the document table to position a regulating member in the vertical direction based on the position of the document table.

7 Claims, 11 Drawing Sheets

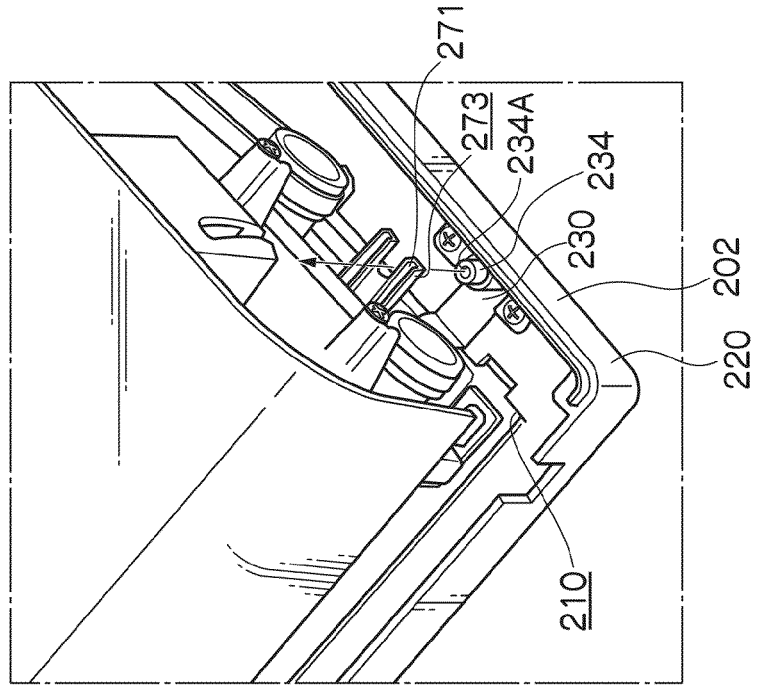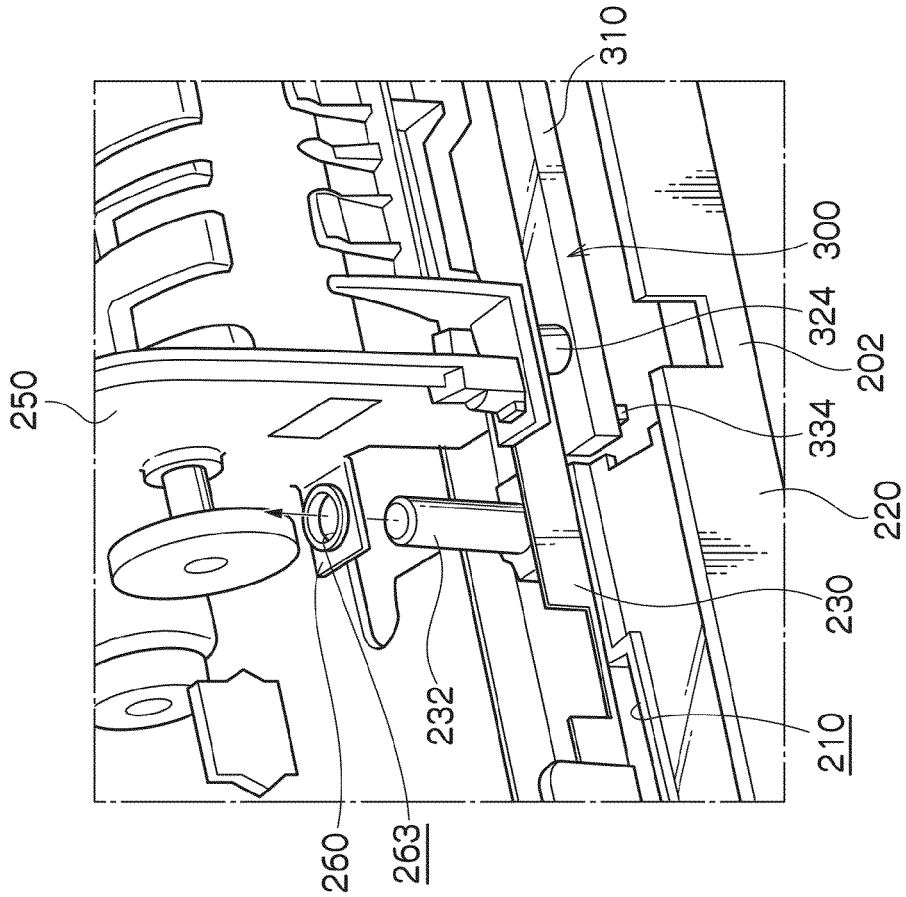

IMAGE READING APPARATUS

CROSS REFERENCE TO RELATED APPLICATION

This application is based on and claims priority under 35 USC 119 from Japanese Patent Application No. 2009-064726 filed Mar. 17, 2009.

BACKGROUND

1. Technical Field

The present invention relates to an image reading apparatus.

2. Related Art

An image reading apparatus (image reading apparatus unit) provided at an upper part of an image forming apparatus, such as a copying machine or a facsimile, separates a plurality of documents on a document tray of a document transporting unit one by one, automatically transports the document to a document reading area (read position) on a platen glass (document table), reads the document, and outputs the document onto an output paper tray of the document transporting unit.

The image reading apparatus needs to prevent a variation in the transport speed of the document at the document reading area.

SUMMARY

The invention has been made in view of the requirements to provide an image reading apparatus capable of reducing a variation in the transport speed of a document at a document reading area, compared to a structure in which a regulating portion is fixed to a frame.

According to a first aspect of the invention, an image reading apparatus includes: a reading unit that has a document table provided on an upper surface thereof and reads a document which is transported to a document reading area on the document table and passes through the document reading area; a cover portion that covers the document table; a mounting portion that connects the cover portion and the reading unit and rotates about a rotating shaft extending in a document transport direction to open the cover portion such that the document table is exposed and to close the cover portion such that the document table is covered with the cover portion; a frame that forms part of the cover portion, is mounted to the mounting portion, and has an opening formed in a portion thereof corresponding to the document reading area when the cover portion is closed; a reinforcing member that is provided in the frame, traverses the opening in a direction orthogonal to the document transport direction, and receives stress from the mounting portion; a document transporting unit that forms part of the cover portion, is arranged on the frame, and transports the document to the document reading area on the document table such that the document passes through the document reading area when the cover portion is closed; a first horizontal positioning member that positions the document transporting unit relative to the reinforcing member in a horizontal direction so that the document transporting unit is movable in a vertical direction; a first vertical positioning member that is provided in the document transporting unit, comes into contact with the document table or the periphery of the document table on the upper surface of the reading unit when the cover portion is closed, and positions the document transporting unit in the vertical direction based on the position of the document table; a regulating member that is provided on the lower side of the reinforcing member, forms a gap between the reinforcing member and the document reading area of the document table, and comes into contact with the document transported to the document reading area to regulate a transport height; a second horizontal positioning member that positions the regulating member relative to the reinforcing member in the horizontal direction so that the regulating member is movable in the vertical direction; and a second vertical positioning member that is provided in the regulating member, comes into contact with the document table or the periphery of the document table on the upper surface of the reading unit when the cover portion is closed, and positions the regulating member in the vertical direction based on the position of the document table.

BRIEF DESCRIPTION OF THE DRAWINGS

Exemplary Embodiments of the present invention will be described in detail based on the following figures, wherein:

FIG. 9A is a perspective view showing a rear-side mounting position between the base frame and the document transporting unit of the cover portion;

FIG. 9B is a perspective view showing a front-side mounting position between the base frame and the document transporting unit of the cover portion;

DETAILED DESCRIPTION

Hereinafter, an image forming apparatus having an image reading apparatus (image reading apparatus unit) according to an exemplary embodiment of the invention integrated therewith will be described with reference to FIGS. 1 to 11.

Figure 1:
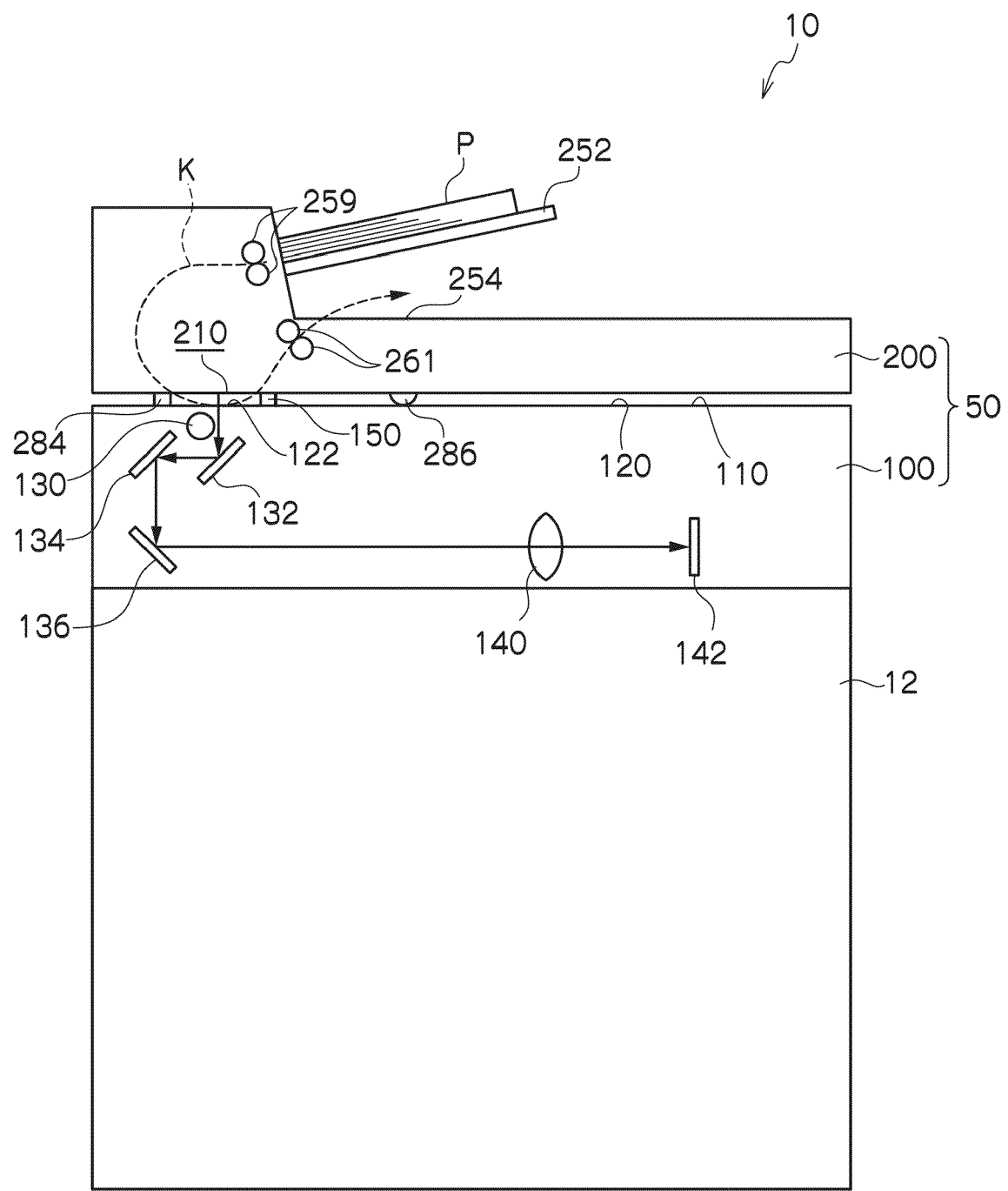
FIG. 1 is a front view schematically showing the structure of an image forming apparatus having an image reading apparatus according to an exemplary embodiment of the invention integrated therewith.
Figure 2:
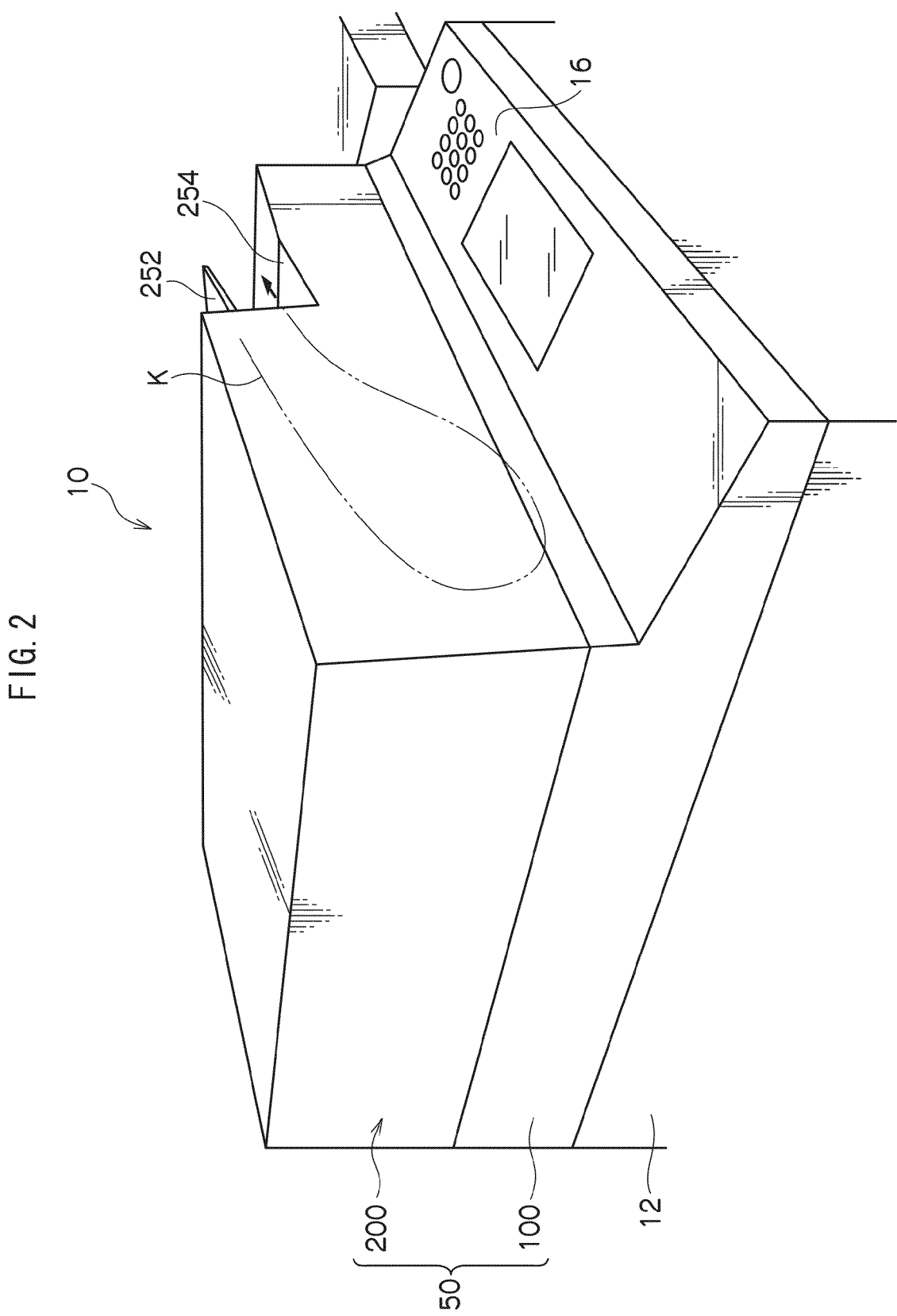
FIG. 2 is a perspective view schematically showing an upper part of the image forming apparatus having the image reading apparatus according to the exemplary embodiment of the invention integrated therewith.
Figure 3:
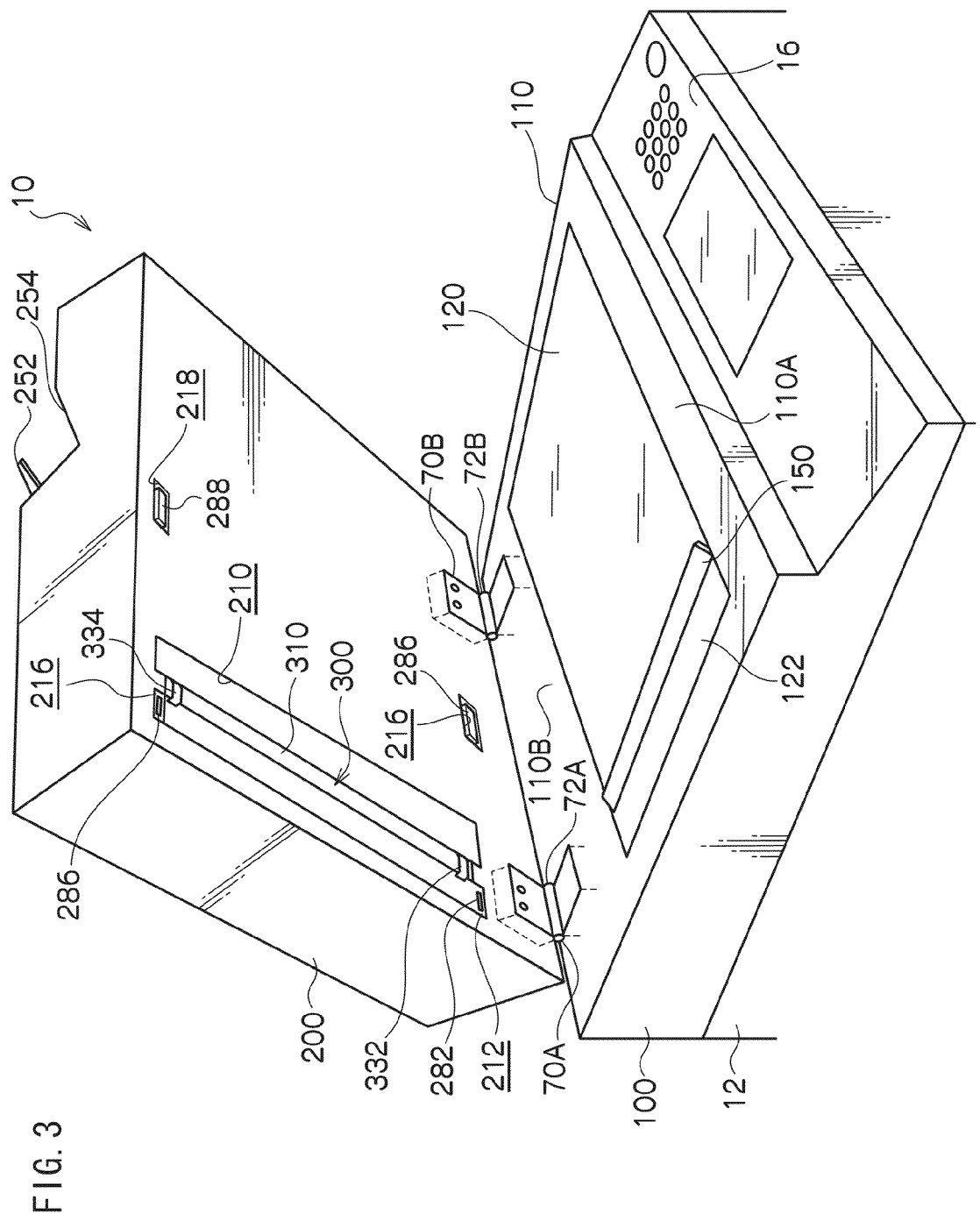
FIG. 3 is a perspective view showing the image forming apparatus shown in FIG. 2 when a cover portion is opened.

FIG. 1 is a front view schematically showing the structure of the image forming apparatus having the image reading apparatus (image reading apparatus unit) according to the exemplary embodiment of the invention integrated therewith. FIG. 2 is a perspective view schematically showing an upper part of the image forming apparatus having the image reading apparatus (image reading apparatus unit) according to the exemplary embodiment of the invention integrated therewith. FIG. 3 is a perspective view showing the image forming apparatus shown in FIG. 2 with a cover portion being opened.

As shown in FIG. 1, an image forming apparatus 10 includes an image forming unit 12 and an image reading apparatus unit 50 according to the exemplary embodiment of the invention that is provided on the image forming unit 12.

The image reading apparatus unit 50 reads the image of a document P, and outputs the read signals to the image forming unit 12. The image forming unit 12 forms an image on a recording medium, such as a recording sheet or an OHP sheet, on the basis of the signals output from the image reading apparatus unit 50. A method of forming the image on the recording medium is not particularly limited. For example, electrophotography, an ink jet recording method, and a thermal transfer method may be used.

As shown in FIGS. 2 and 3, a control panel 16 is provided in the front surface of the image forming apparatus 10. A side of the control panel 16 is a front side, and a side opposite to the control panel 16 is a rear side. In FIGS. 1 and 2, a dashed line K indicates a path K through which a document P is transported by a document transporting unit 250 (see FIGS. 4 and 5, which will be described in detail below) of a cover portion 200 of the image reading apparatus unit 50, which will be described below. That is, the front and rear sides are aligned with a direction orthogonal to the transport path (transport direction) K of the document P.

As shown in FIG. 3, the image reading apparatus unit 50 includes a reading unit 100 having a transparent platen glass 120 on which the document P may be placed provided on an upper surface 110 thereof and the cover portion 200 (see FIG. 2) that covers the platen glass 120. In addition, the reading unit 100 and the cover portion 200 are connected to each other by counter balances 70A and 70B.

The counter balances 70A and 70B rotate about rotating shafts 72A and 72B to open and close the cover portion 200 such that the platen glass 120 is exposed (see FIG. 3) or covered with the cover portion 200 (see FIG. 2), respectively (i.e. they perform a hinge function). When the cover portion 200 is open, the counter balances 70A and 70B generate a force against the cover portion 200 closing due to gravity using, for example, springs, thereby maintaining the open state (see FIG. 3). The counter balances 70A and 70B have the same general structure as those found in the conventional art, and thus a detailed description thereof will be omitted here.

In the specification, the direction in which the cover portion 200 covers the platen glass 120 (see FIG. 2) is the vertical direction unless otherwise specified.

Next, the reading unit 100 will be described. The reading unit 100 has the same general structure as those found in the conventional art. Therefore, the reading unit 100 will be briefly described. The structure of the reading unit 100 according to this exemplary embodiment of the invention is just an example, and the reading unit may have other structures.

The transparent platen glass 120 having an upper surface on which the document P may be placed is provided on an upper surface 110 of the reading unit 100. One end of the platen glass 120 in the direction of the document transport path K is a document reading area 122. When the document P is transported and passes through the document reading area 122, the image of the document is read.

A light source 130, such as a fluorescent lamp or an LED, emitting illumination light to the document P that is transported and passes through the document reading area 122, is provided below the document reading area 122 of the platen glass 120. The light source 130 extends in a direction orthogonal to the direction of the document transport path K.

Light emitted from the light source 130 passes through the platen glass 120 and is then incident on the document P passing through the document reading area 122 of the platen glass 120. The light incident on the document P is reflected from the surface (image formed surface) of the document P and the reflected light passes through the platen glass 120. The reflected light is reflected from a first reflecting mirror 132, a second reflecting mirror 134, and a third reflecting mirror 136 provided in the reading unit 100.

The light reflected from the third reflecting mirror 136 is focused on a light detecting unit 142, such as a CCS, by a lens 140 provided in the reading unit 100. The image of the document P is read by the light focused by the light detecting unit 142.

The cover portion 200 covers the upper surface of the platen glass 120 to prevent external light from being incident on the platen glass 120 and the document P (see the closed state shown in FIG. 2).

As shown in FIG. 1, the cover portion 200 includes a document tray 252 on which the documents P are placed so as to be aligned substantially. The documents P placed on the document tray 252 are continuously fed one by one by a pair of document sheet feed rollers 259 and transported by a plurality of transport roller pairs (not shown).

Then, the document is outputted from an opening 210 (see FIG. 3) formed in a portion of the lower surface of the cover portion 200 corresponding to the document reading area 122 and then transported to the document reading area 122 (see FIG. 3) of the platen glass 120 of the reading unit 100. As described above, the reading unit 100 reads the image of the document P moving along the upper surface of the document reading area 122 (platen glass 120). After the image of the document P is read, the document P is put into the cover portion 200 again by a jump portion 150 (see FIG. 3) having a substantially triangular shape in a longitudinal cross-sectional view in the document transport direction and then outputted to an output paper tray portion 254 by a pair of output rollers 261.

Figure 10:
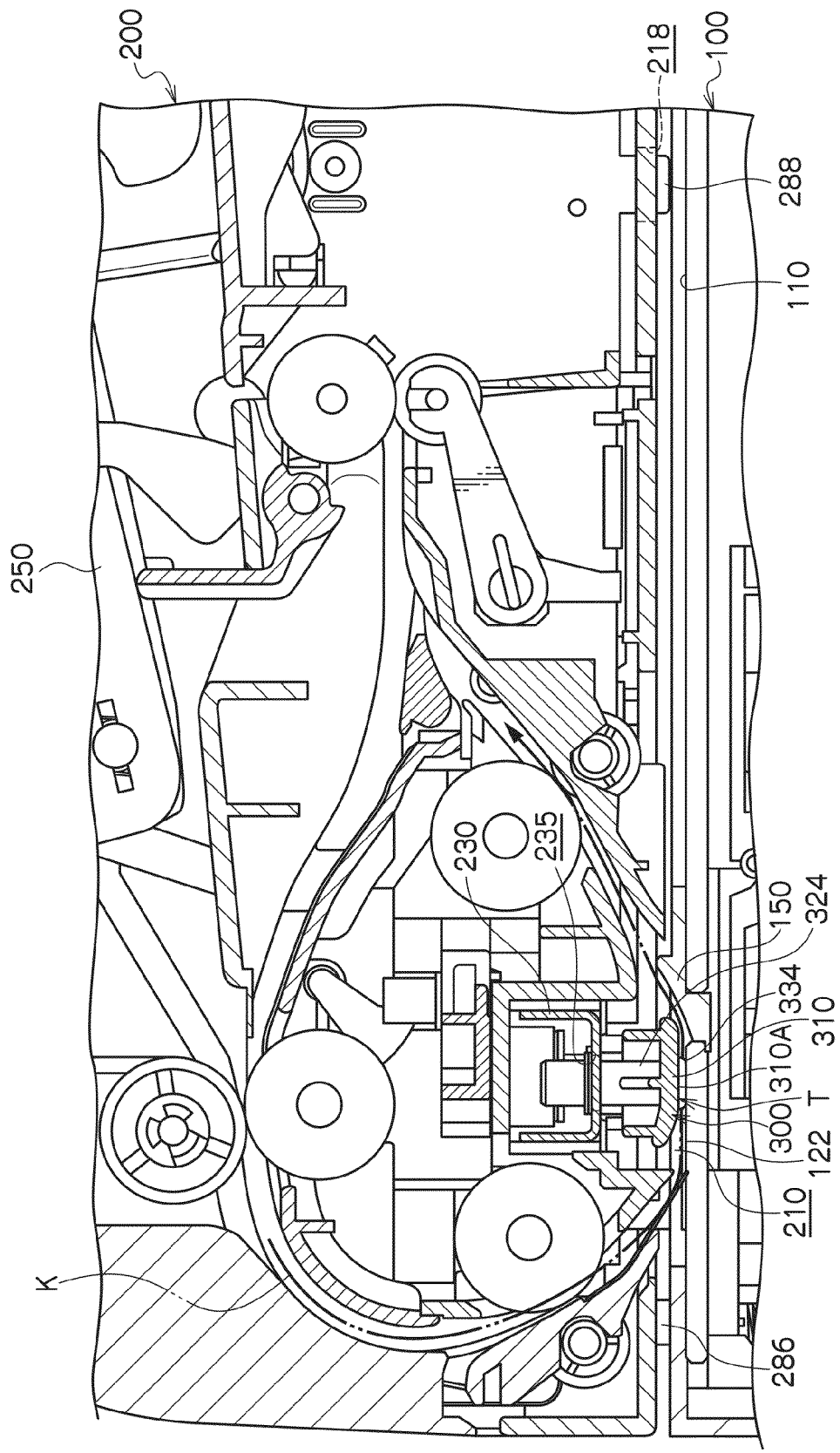
FIG. 10 is a cross-sectional view showing a main part of the image reading apparatus along a document transport direction.
Figure 11:
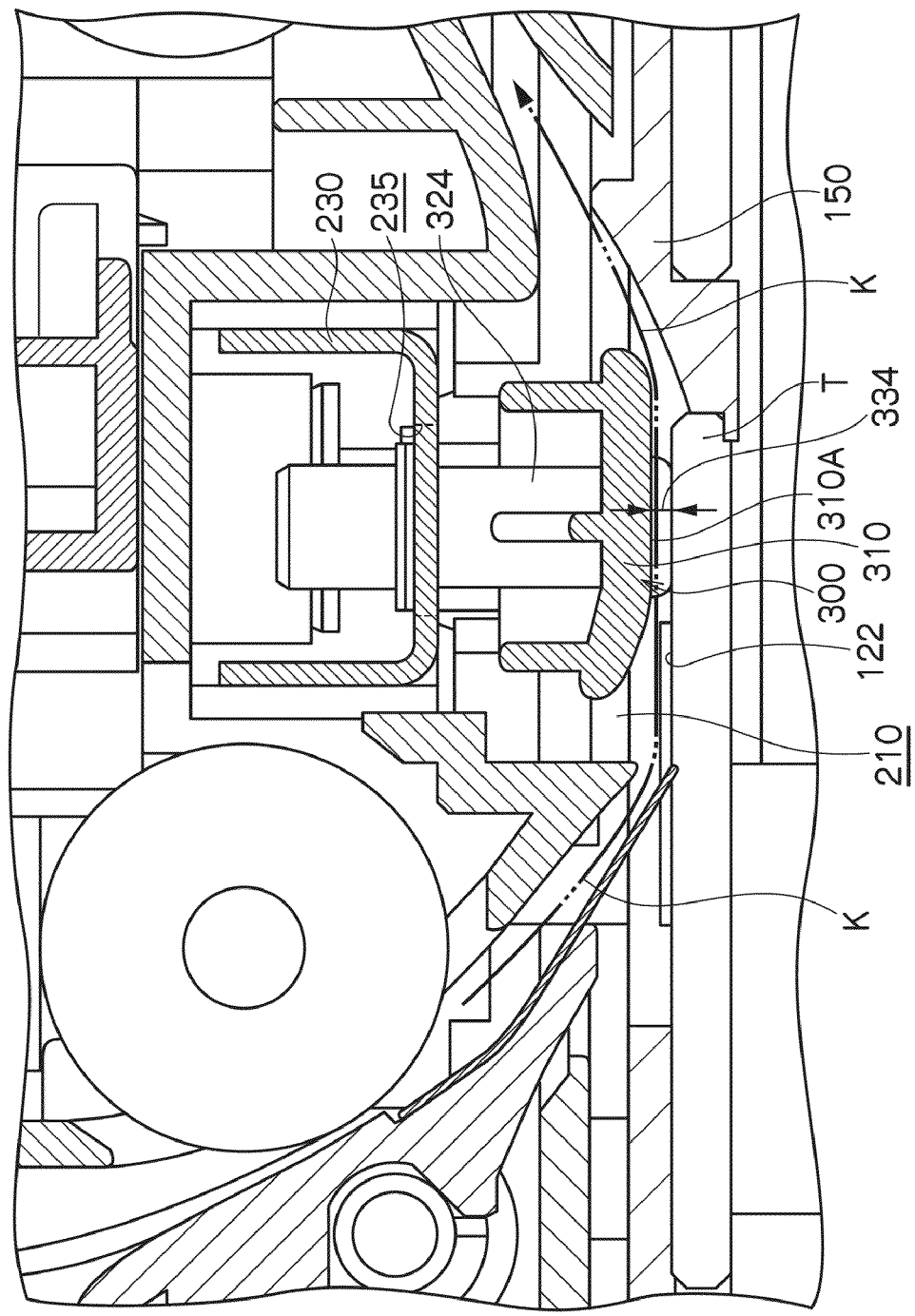
FIG. 11 is a partial enlarged cross-sectional view of FIG. 10.

As shown in FIGS. 10 and 11, the document P moving along the upper surface of the document reading area 122 of the platen glass 120 passes through a gap T between a lower surface 310A of a regulating portion 310 of a document height regulating member 300, which will be described below, and the platen glass 120. That is, the document P is transported while being guided by the lower surface 310A of the regulating portion 310.

Next, the cover portion 200 of the image reading apparatus unit 50 will be described in detail with reference to FIGS. 4 to 11.

Figure 4:
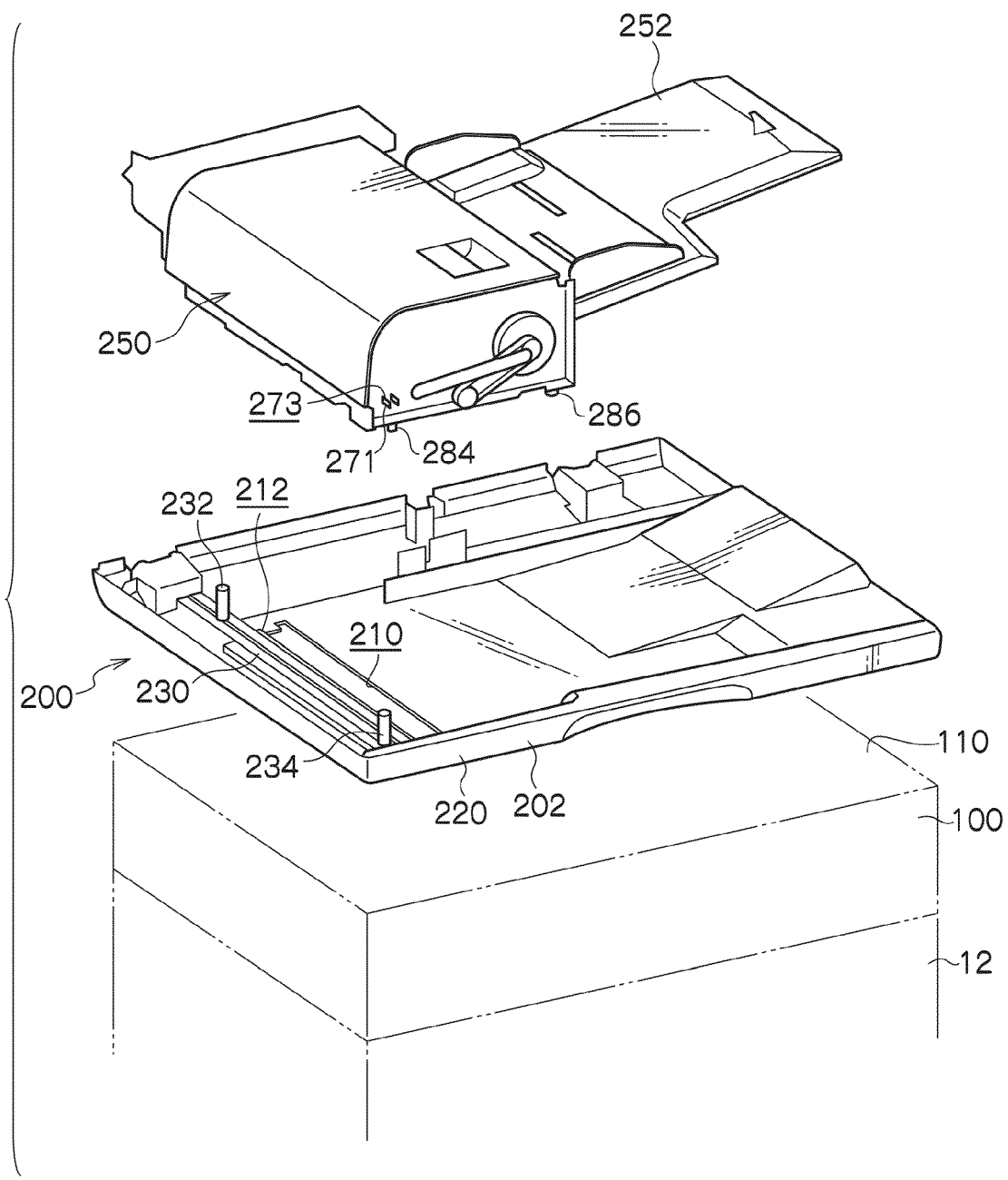
FIG. 4 is an exploded perspective view showing a base frame and a document transporting unit of the cover portion, as viewed from the rear side.
Figure 5:
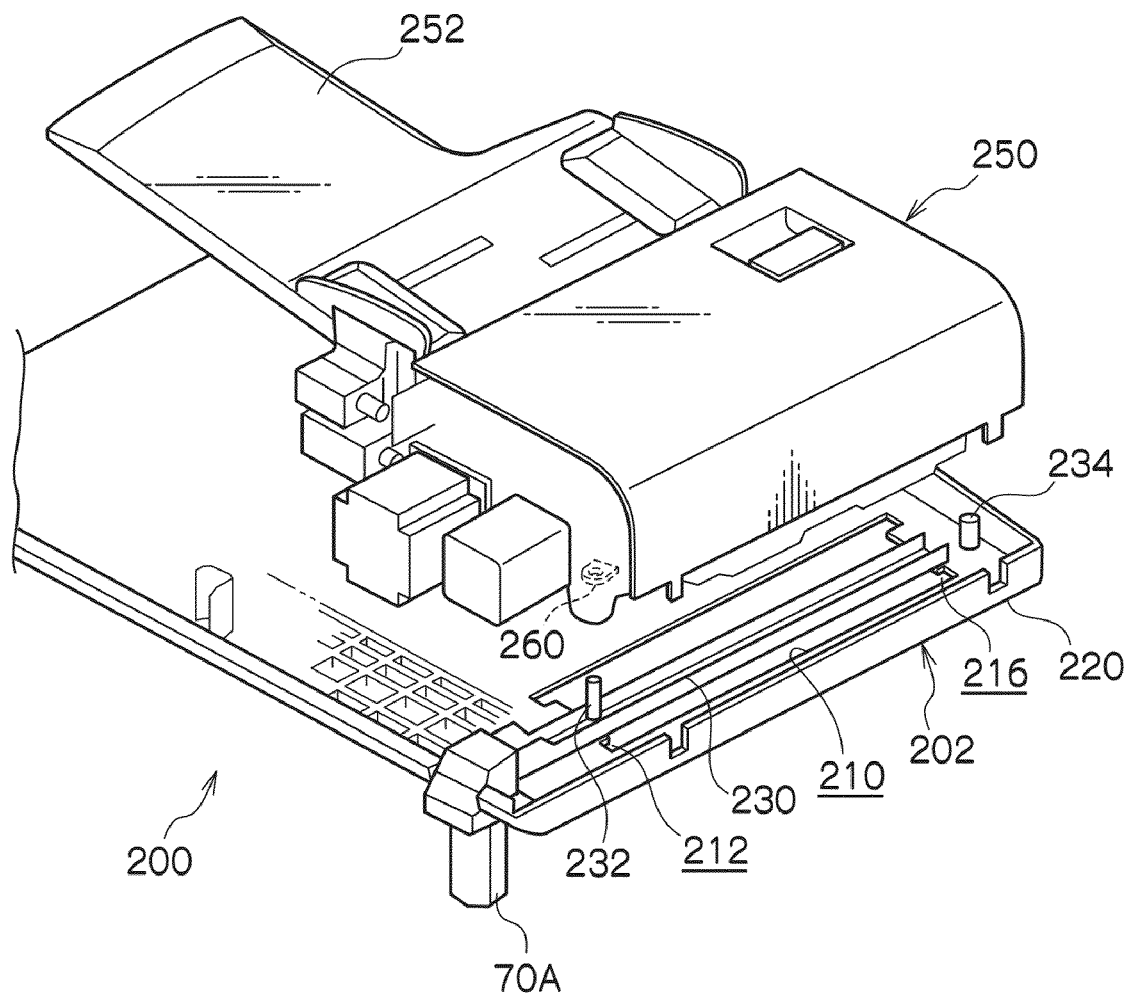
FIG. 5 is an exploded perspective view showing the base frame and the document transporting unit of the cover portion, as viewed from the front side.
Figure 6:
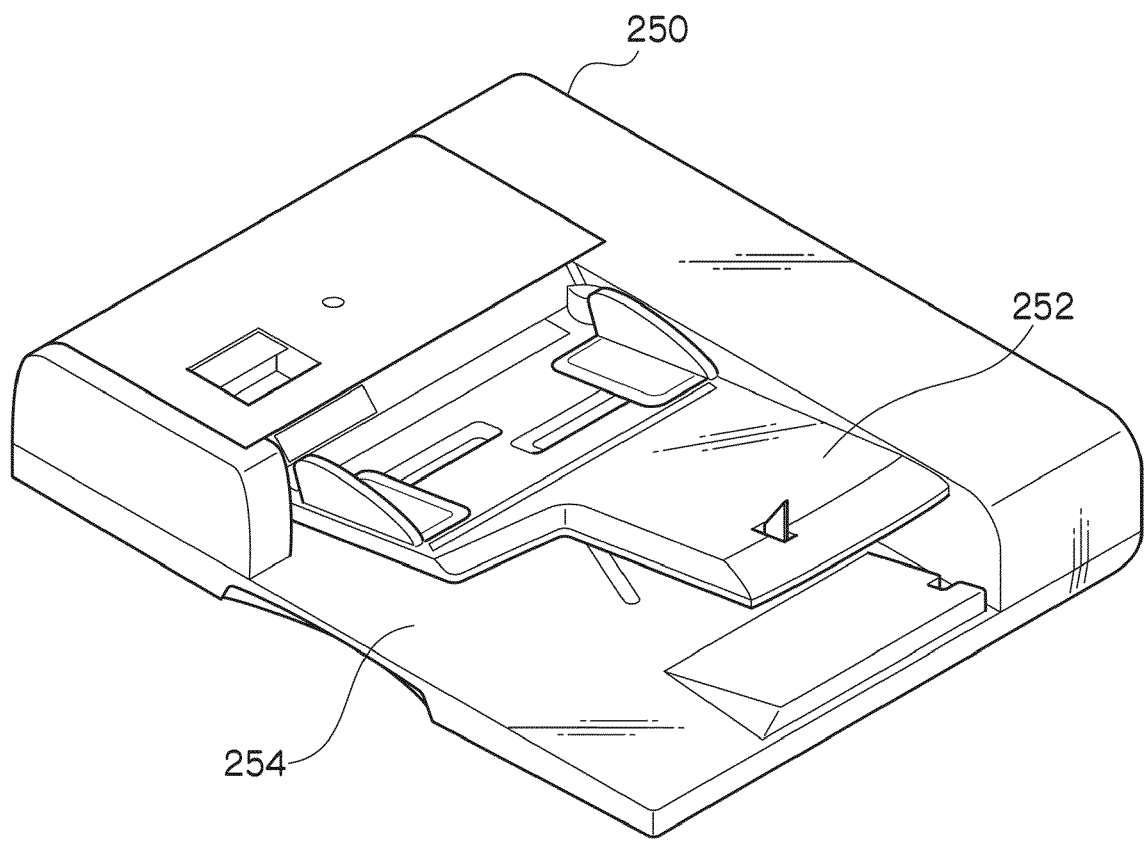
FIG. 6 is a perspective view showing the document transporting unit of the cover portion, as obliquely viewed from the upper side.
Figure 7:
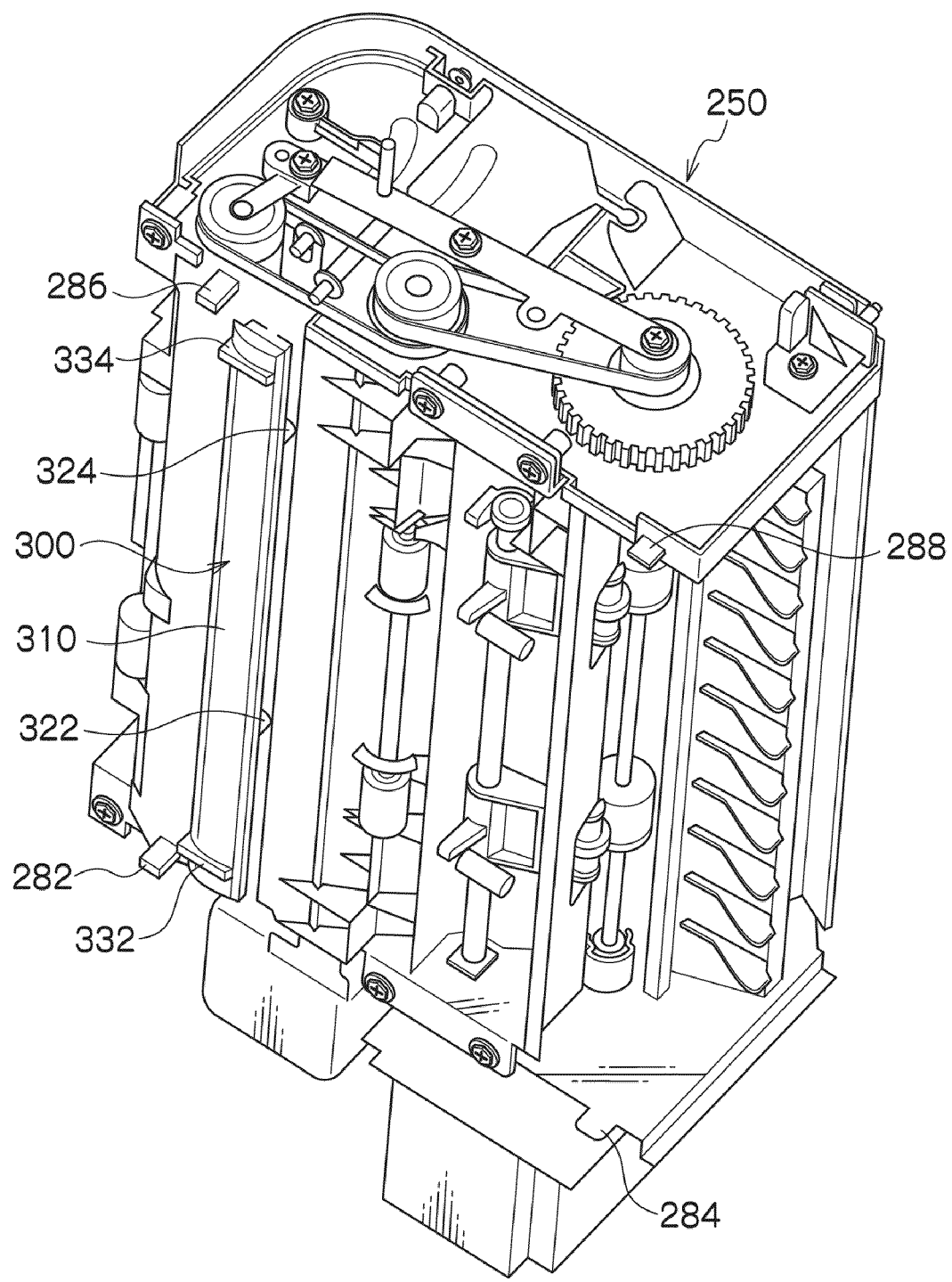
FIG. 7 is a perspective view showing the document transporting unit of the cover portion, as obliquely viewed from the lower side.
Figure 8:
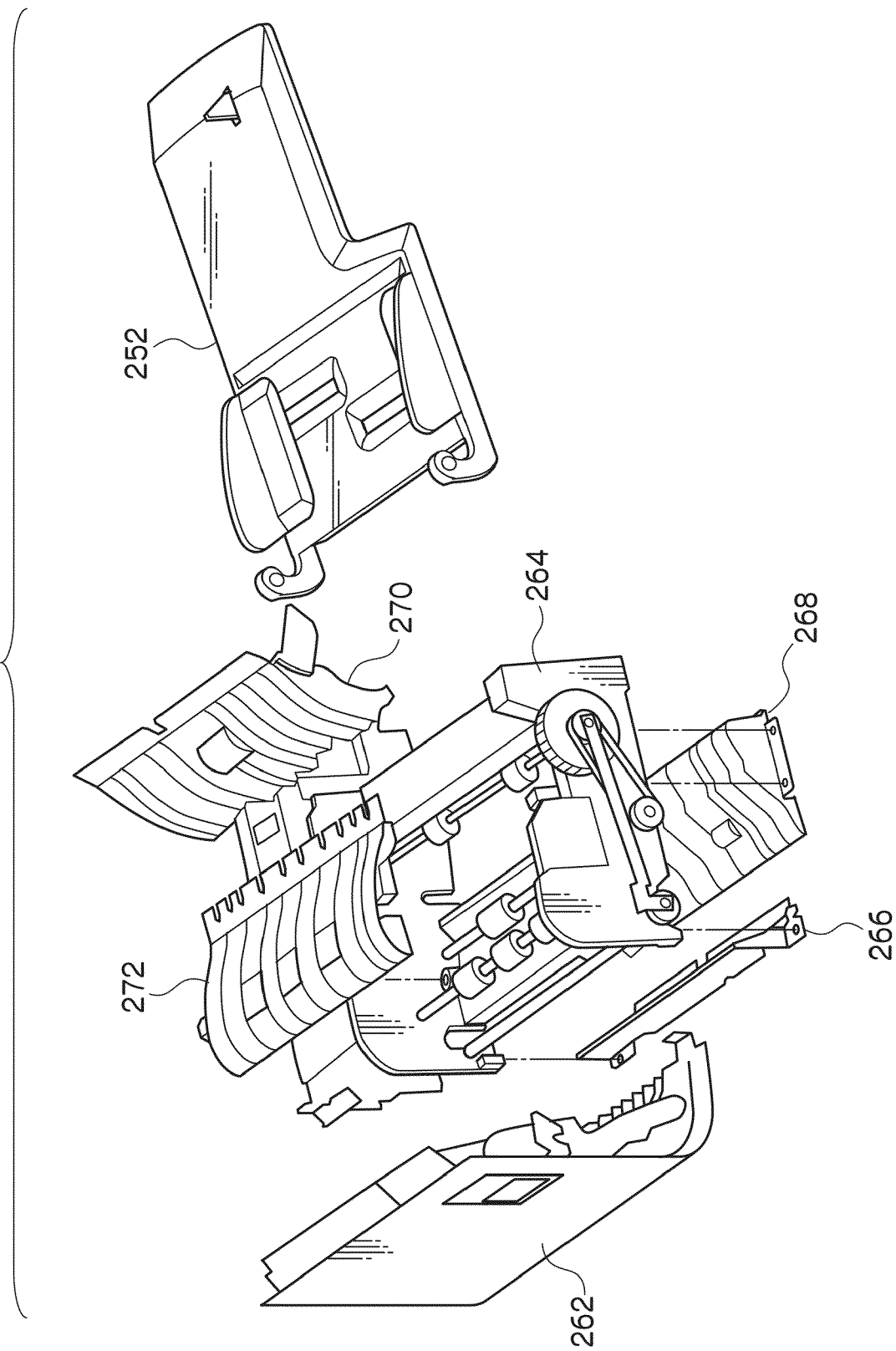
FIG. 8 is an exploded perspective view showing the document transporting unit of the cover portion.

FIG. 4 is an exploded perspective view showing a base frame 202 and a document transporting unit 250 of the cover portion 200, as viewed from the rear side. FIG. 5 is an exploded perspective view showing the base frame 202 and the document transporting unit 250 of the cover portion 200, as viewed from the front side. FIG. 6 is a perspective view showing the document transporting unit 250 of the cover portion 200, as obliquely viewed from the upper side. FIG. 7 is a perspective view showing the document transporting unit 250 of the cover portion 200, as obliquely viewed from the lower side. FIG. 8 is an exploded perspective view showing the document transporting unit 250 of the cover portion 200. FIG. 9A is a perspective view showing a rear-side mounting position between the base frame 202 and the document transporting unit 250 of the cover portion 200, and FIG. 9B is a perspective view showing a front-side mounting position therebetween. FIG. 10 is a cross-sectional view showing a main part of the image reading apparatus unit 50 along the document transport direction. FIG. 11 is a partial enlarged cross-sectional view of FIG. 10.

As shown in FIGS. 4 and 5, the cover portion 200 includes the base frame 202 and the document transporting unit 250 (see FIG. 6) that is provided on the base frame 202 and transports the document P along the document transport path K (see FIG. 1). The document transporting unit 250 is configured to be easily removed from the base frame 202 (which will be described in detail below).

As shown in FIG. 8, the document transporting unit 250 (see FIG. 6) includes, for example, a cover assembly 262, a frame assembly feed 264, a sheet transport path assembly registration 266, a sheet transport path assembly out 268, a sheet transport path assembly retard 270, a sheet transport path assembly inverter 272, and a document tray 252.

The cover assembly 262 and the sheet transport path assembly retard 270 are not connected to the frame assembly feed 264 by screws. Therefore, when the document transporting unit 250 is removed from the cover portion 200 (base frame 202), the cover assembly 262 and the sheet transport path assembly retard 270 may be separated from the frame assembly feed 264.

The sheet transport path assembly registration 266 and the sheet transport path assembly inverter 272 are fixed to the frame assembly feed 264 at two points by screws. Therefore, the sheet transport path assembly registration 266 and the sheet transport path assembly inverter 272 may be removed from the frame assembly feed 264 by detaching the document transporting unit 250 from the cover portion 200 (base frame 202) and loosening the screws.

The sheet transport path assembly out 268 is connected to the frame assembly feed 264 at four points by screws. Therefore, the sheet transport path assembly out 268 may be removed from the frame assembly feed 264 by detaching the document transporting unit 250 from the cover portion 200 (base frame 202) and loosening the screws.

When the cover portion is removed, it is possible to easily remove, for example, a motor, a solenoid, an interlock switch, and a sensor (none of which are shown in the drawings) provided in the frame assembly feed 264.

That is, the document transporting unit 250 may be easily removed from the cover portion (base frame 202). In addition, it may be easily attached to or detached from each part.

As shown in FIG. 5, the base frame 202 includes a frame body 220 made of a resin. The counter balances 70A and 70B (the counter balance 70B is not shown in FIG. 5) are attached to both ends of the rear side of the frame body 220 in the transport direction.

As shown in FIGS. 4 and 5, the opening 210 (see FIGS. 1 and 3) is formed in the frame body 220. As described above, the opening 210 is formed in a portion of the frame body corresponding to the document reading area 122 when the cover portion 200 is closed (see FIG. 2). In addition, a reinforcing member 230 that traverses the opening 210 in a direction orthogonal to the direction of the document transport path K is provided on the upper surface of the frame body 220.

The reinforcing member 230 is a metal plate whose rigidity is higher than that of the resin frame body 220. In addition, the reinforcing member 230 has an opened upper portion and is substantially U-shaped in a cross-section (see FIGS. 10 and 11).

The rear-side end of the reinforcing member 230 is connected to the counter balance 70A. Therefore, stress from the counter balance 70A when the cover portion 200 is opened or closed, or stress from the counter balance 70A when the cover portion 200 is maintained in an opened state, is applied to the reinforcing member 230 (stress acts on the reinforcing member). That is, the reinforcing member 230 receives the stress from the counter balance 70A.

As shown in FIG. 4, a pin 234 is vertically provided at the front-side end of the reinforcing member 230 of the base frame 202 (the front side of the opening 210). In addition, as shown in FIG. 5, a pin 232 is vertically provided at the rear-side end of the reinforcing member 230 of the base frame 202 (the rear side of the opening 210).

As shown in FIGS. 4 and 9B, a protruding portion 271 that protrudes toward the front side is provided on the front side of the document transporting unit 250. A recessed portion 273 whose front side is opened and which is substantially U-shaped in plan view is formed in the protruding portion 271.

As shown in FIGS. 5 and 9A, a protruding portion 260 that protrudes toward the rear side is provided on the rear side of the document transporting unit 250. A through hole 263 extending in the vertical direction is formed in the protruding portion 260.

As shown in FIGS. 9A and 9B, the pin 232 formed at the rear-side end of the reinforcing member 230 is inserted into the through hole 263 formed in the rear-side protruding portion 260 of the document transporting unit 250, and the pin 234 formed at the front-side end of the reinforcing member 230 is inserted into the recessed portion 273 formed in the front-side protruding portion 271 of the document transporting unit 250. In this way, the document transporting unit 250 is positioned relative to the reinforcing member 230 in the horizontal direction. The reinforcing member 230 may be moved in the vertical direction of the document transporting unit 250.

In addition, a screw (not shown) is inserted into an upper portion 234A of the pin 234 provided at the front-side end of the reinforcing member 230, and there is a gap between the head of the screw (not shown) and the protruding portion 271 so as not to hinder the movement of the document transporting unit 250 in the vertical direction. That is, the document transporting unit 250 may be moved in the vertical direction in the range of the gap between the head of the screw and the protruding portion 271.

In this way, the document transporting unit 250 is simply placed on the base frame 202 and is configured to be easily removable therefrom. That is, the document transporting unit 250 may be easily attached to or detached from the base frame 202.

As shown in FIG. 7, legs 282, 284, 286, and 288 are formed on the lower surface of the document transporting unit 250 so as to protrude downward.

As shown in FIGS. 3 and 5, recessed portions 212 and 216 for legs are formed in portions corresponding to the legs 282 and 286 at both ends of the opening 210 of the frame body 220 of the base frame 202 in the longitudinal direction. In addition, as shown in FIG. 3, holes 214 and 218 for legs are formed in portions of the frame body 220 of the base frame 202 corresponding to the legs 284 and 288.

Therefore, the legs 282, 284, 286, and 288 of the document transporting unit 250 are inserted into the recessed portions 212 and 216 for legs and the holes 214 and 218 for legs. The legs 282, 284, 286, and 288 are exposed from the cover portion 200 (base frame 202).

When the cover portion 200 covers the platen glass 120 (see FIG. 2), the legs 282 and 286 of the document transporting unit 250 come into contact with the platen glass 120 of the reading unit 100 (outside a region in which the document P is transported) and the legs 284 and 288 come into contact with the outer regions (periphery) 110A and 110B (see FIG. 3) of the platen glass 120 to support the document transporting unit 250. In this way, the document transporting unit 250 is positioned in the vertical direction based on the position of the platen glass 120. In this state, the document transporting unit 250 may be moved in the vertical direction relative to the base frame 202. Therefore, the document transporting unit 250 is slightly separated vertically from the base frame 202.

As shown in FIG. 7, the document height regulating member 300 is exposed through the opening 210. The document height regulating member 300 includes a plate-shaped regulating portion 310 that extends in a direction orthogonal to the document transport direction, shaft portions 322 and 324 that are provided at both ends of the regulating portion 310 in the longitudinal direction (the direction orthogonal to the document transport direction) so as to extend upward in the vertical direction, and ribs 332 and 334 that are provided at both ends of the regulating portion 310 in the longitudinal direction (the direction orthogonal to the document transport direction) so as to protrude upward in the vertical direction.

As shown in FIGS. 10 and 11, insertion holes 235 are formed in the vertical direction at both ends of the reinforcing member 230, and the shaft portions 322 and 324 (only the shaft portion 324 is shown in the drawings) of the document height regulating member 300 are inserted into the insertion holes 235. Therefore, the regulating portion 310 of the document height regulating member 300 is positioned relative to the reinforcing member 230 in the horizontal direction so that the regulating portion 310 is movable in the vertical direction. Portions having sizes that are larger than the outside diameters of the shaft portions 322 and 324 and the diameters of the insertion holes 235 of the reinforcing member 230 are formed in the shaft portions 322 and 324 to prevent the document height regulating member 300 from being taken off from the insertion holes 235.

The regulating portion 310 of the document height regulating member 300 and the reinforcing member 230 are arranged so as to be aligned substantially in plan view.

When the cover portion 200 covers the platen glass 120 (see FIG. 2), the ribs 332 and 334 of the regulating portion 310 of the height regulating member 300 come into contact with the platen glass 120 (outside the region in which the document P is transported) to support the document height regulating member 300 (regulating portion 310). Therefore, the lower surface 310A of the regulating portion 310 of the document height regulating member 300 is positioned relative to the platen glass 120 in the vertical direction. The ribs 332 and 334 may come into contact with the outer region of the platen glass 120 in the upper surface 110.

A pressing member, such as a spring, pressing the document height regulating member 300 downward may be provided such that the ribs 332 and 334 of the document height regulating member 300 reliably come into contact with the platen glass 120.

Since the document height regulating member 300 is not held in the document transporting unit 250, the document height regulating member 300 would not normally be shown in the configuration shown in FIG. 7. However, the document height regulating member 300 is shown in FIG. 7 in order to make the present explanation easier to understand.

Next, the operation of this embodiment will be described.

When the cover portion 200 covers the platen glass 120 (see FIG. 2), the document transporting unit 250 is positioned relative to the reinforcing member 230 in the horizontal direction so that the document transporting unit 250 is movable in the vertical direction, and the legs 282, 284, 286, and 288 come into contact with the platen glass 120 or the regions 110A and 110B outside (periphery of) the platen glass 120 on the upper surface 110 of the reading unit 100 and are positioned in the vertical direction based on the position of the platen glass 120. Therefore, the document transporting unit 250 is more accurately positioned based on the position of the platen glass 120, compared to a structure in which the document transporting unit 250 is fixed to the base frame 202.

The document height regulating member 300 is positioned relative to the reinforcing member 230 in the horizontal direction so that the document height regulating member 300 is movable in the vertical direction, and the ribs 332 and 334 of the regulating portion 310 come into contact with the platen glass 120 and are positioned in the vertical direction. Therefore, the regulating portion 310 of the document height regulating member 300 is more accurately positioned relative to the platen glass 120, compared to the structure in which the document height regulating member 300 (regulating portion 310) is fixed to the base frame 202 or the document transporting unit 250.

Therefore, the regulating portion 310 (document height regulating member 300) and the document transporting unit 250 are accurately positioned relative to the platen glass 120 (based on the position of the platen glass 120), and the regulating portion 310 is accurately positioned relative to the document transporting unit 250 based on the position of the platen glass 120. That is, positional irregularity of the regulating portion 310 and the document transporting unit 250 relative to the platen glass 120 is reduced, and positional irregularity of the regulating portion 310 relative to the document transporting unit 250 is reduced. Therefore, a variation in the transport resistance of the document P is reduced further, compared to the structure in which the regulating portion 310 (document height regulating member 300) is fixed to the base frame 120. As a result, a variation in the transport speed of the document P at the document reading area 122 is reduced.

As shown in FIGS. 10 and 11, an irregularity in the gap T between the lower surface 310A of the regulating portion 310 and the platen glass 120 is reduced, compared to the structure in which the regulating portion 310 (document height regulating member 300) is fixed to the base frame 202. Therefore, it is possible to narrow the gap T. As such, since the irregularity in the gap T is reduced and the gap T is narrowed, an angle between the document P and the jump portion 150 when the document P comes into contact with the jump portion 150 is reduced. Therefore, a variation in the transport resistance of the document P when the document P comes into contact with the jump portion 150 is reduced. As a result, a variation in the transport speed of the document P at the document reading area 122 is reduced.

When the cover portion 200 covers the platen glass 120 (see FIG. 2), the document transporting unit 250 is supported by the legs 282, 284, and 286, and the load (weight) of the document transporting unit 250 is not applied to the base frame 202. Therefore, the deformation of the base frame 202 is reduced, compared to the structure in which the document transporting unit 250 is fixed to the base frame 202 (the base frame 202 supports the document transporting unit 250). As a result, the document transport path K is accurately positioned in this regard.

In addition, stress from the counter balance 70A when the cover portion 200 is opened or closed or when the cover portion 200 is maintained in an opened state is applied to the reinforcing member 230. That is, the reinforcing member 230 receives the stress from the counter balance 70A. Therefore, the deformation of the frame body 220, particularly, the deformation of a portion around (in the vicinity of) the opening 210 is prevented or reduced, compared to the structure in which the reinforcing member 230 is provided in other portions.

In the document transporting unit 250, transport members from a sheet feed member to a sheet output member are integrated into a unit. The document transporting unit 250 is configured to be easily attached to or detached from the reinforcing member 230. Therefore, the image forming apparatus may be easily assembled and maintained. In addition, since positioning in the vertical direction is not needed, it is not necessary to perform an adjustment operation and a test operation after a maintenance operation.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
a reading unit that has a document table provided on an upper surface thereof and reads a document which is transported to a document reading area on the document table and passes through the document reading area;
a cover portion that covers the document table;
a mounting portion that connects the cover portion and the reading unit and rotates about a rotating shaft extending in a document transport direction to open the cover portion such that the document table is exposed and to close the cover portion such that the document table is covered with the cover portion;
a frame that forms part of the cover portion, is mounted to the mounting portion, and has an opening formed in a portion thereof corresponding to the document reading area when the cover portion is closed;
a reinforcing member that is provided in the frame, traverses the opening in a direction orthogonal to the document transport direction, and receives stress from the mounting portion;
a document transporting unit that forms part of the cover portion, is arranged on the frame, and transports the document to the document reading area on the document table such that the document passes through the document reading area when the cover portion is closed;
a first horizontal positioning member that positions the document transporting unit relative to the reinforcing member in a horizontal direction so that the document transporting unit is movable in a vertical direction;
a first vertical positioning member that is provided in the document transporting unit, comes into contact with the document table or the periphery of the document table on the upper surface of the reading unit when the cover portion is closed, and positions the document transporting unit in the vertical direction based on the position of the document table;
a regulating member that is provided on the lower side of the reinforcing member, forms a gap between the reinforcing member and the document reading area of the document table, and comes into contact with the document transported to the document reading area to regulate a transport height;
a second horizontal positioning member that positions the regulating member relative to the reinforcing member in the horizontal direction so that the regulating member is movable in the vertical direction; and
a second vertical positioning member that is provided in the regulating member, comes into contact with the document table or the periphery of the document table on the upper surface of the reading unit when the cover portion is closed, and positions the regulating member in the vertical direction based on the position of the document table.

2. The image reading apparatus of claim 1,
wherein the regulating member and the reinforcing member are arranged so as to be substantially aligned in plan view.

3. The image reading apparatus of claim 1,
wherein the mounting portion generates a force against a force that closes the cover portion due to gravity when the cover portion is opened, in order to maintain the cover portion in the opened state.

4. The image reading apparatus of claim 1,
wherein the first horizontal positioning member includes:
a first pin that is vertically provided at one end of the reinforcing member;
a second pin that is vertically provided at the other end of the reinforcing member;
a first protruding portion that protrudes from the document transporting unit and has a through hole formed therein into which the first pin is inserted; and
a second protruding portion that protrudes from the document transporting unit and has a recessed portion formed therein into which the second pin is inserted.

5. The image reading apparatus of claim 1,
wherein the first vertical positioning member includes a plurality of legs provided on a lower surface of the document transporting unit so as to protrude downward,
recessed portions for legs or holes for legs are formed in portions of the frame respectively corresponding to the plurality of legs, and
the plurality of legs inserted into the recessed portions for legs or the holes for legs respectively come into contact with the document table to support the document transporting unit.

6. The image reading apparatus of claim 1,
wherein the second horizontal positioning member includes:
shaft portions that are provided at both ends of the regulating member in a direction orthogonal to the document transport direction so as to extend upward in the vertical direction; and
insertion holes which are formed at both ends of the reinforcing member and into which the shaft portions are inserted.

7. The image reading apparatus of claim 1,
wherein the second vertical positioning member includes ribs that are provided at both ends of the regulating member in a direction orthogonal to the document transport direction so as to protrude downward in the vertical direction, and
the ribs come into contact with the document table to support the regulating member.

* * * * *